(12) United States Patent
Willach et al.

(10) Patent No.: US 11,317,741 B2
(45) Date of Patent: May 3, 2022

(54) ACCOMMODATION DEVICE FOR ACCOMMODATING STORAGE CONTAINERS

(71) Applicant: Gebr. Willach GmbH, Ruppichteroth (DE)

(72) Inventors: Jens Willach, Eitorf (DE); Ole Gutmann, St. Augustin (DE)

(73) Assignee: Gebr. Willach GmbH, Ruppichteroth (DE)

( * ) Notice: Subject to any disclaimer, the term of this patent is extended or adjusted under 35 U.S.C. 154(b) by 0 days.

(21) Appl. No.: 17/029,434

(22) Filed: Sep. 23, 2020

(65) Prior Publication Data

US 2021/0085102 A1 Mar. 25, 2021

(30) Foreign Application Priority Data

Sep. 25, 2019 (DE) ..................... 20 2019 105 308.9

(51) Int. Cl.
| | |
|---|---|
| *A47F 7/28* | (2006.01) |
| *B65D 33/14* | (2006.01) |
| *F16B 1/00* | (2006.01) |
| *F16B 2/18* | (2006.01) |

(52) U.S. Cl.
CPC .............. *A47F 7/285* (2013.01); *B65D 33/14* (2013.01); *F16B 1/00* (2013.01); *F16B 2/185* (2013.01); *F16B 2001/0035* (2013.01)

(58) Field of Classification Search
CPC .......... A47F 7/285; A47F 5/0006; A47F 7/24; B65D 33/14; B65D 85/185; F16B 1/00; F16B 2/185; F16B 2001/0035; B65G 1/0457
See application file for complete search history.

(56) References Cited

U.S. PATENT DOCUMENTS

| | | | | | |
|---|---|---|---|---|---|
| 669,142 | A | * | 3/1901 | Love .................... | B65D 85/185 211/124 |
| 773,017 | A | * | 10/1904 | Keuffel ............. | A47G 25/0657 211/124 |
| 2,036,761 | A | * | 4/1936 | Krause ...................... | C14B 1/26 211/45 |
| 3,567,034 | A | * | 3/1971 | Mozelsio .............. | E05B 69/006 211/7 |
| 3,627,143 | A | * | 12/1971 | Alexander ............. | A47G 25/02 211/123 |
| 4,020,951 | A | * | 5/1977 | Wurthner ............ | B42F 15/0029 211/46 |

(Continued)

*Primary Examiner* — Ko H Chan
(74) *Attorney, Agent, or Firm* — Maier & Maier, PLLC

(57) ABSTRACT

An accommodation device for accommodating storage containers of pre-assorted goods, including at least one holding frame and a plurality of storage containers for accommodating pre-assorted goods. The holding frame includes a plurality of spaced-apart holders, and each storage device includes a suspension device made to fit one of the holders. Each suspension device is adapted to be attached to one of the holders for suspendingly arranging the respective storage device at the holding frame. At least some of the holders respectively include a safety device which cooperates with the suspension device when the suspension device is attached to a holder and, in a locking position, prevents the suspension device from detaching itself from the respective holder.

7 Claims, 2 Drawing Sheets

(56) References Cited

U.S. PATENT DOCUMENTS

| | | | | |
|---|---|---|---|---|
| 4,832,290 A * | 5/1989 | Baglio | ............... | B65D 71/50 |
| | | | | 248/311.2 |
| 4,953,718 A * | 9/1990 | Graff | ............... | A47G 25/0692 |
| | | | | 211/105.1 |
| 5,018,627 A * | 5/1991 | Moore | ............... | A47F 7/24 |
| | | | | 206/291 |
| 5,160,048 A * | 11/1992 | Leyden | ............... | A47F 7/24 |
| | | | | 211/7 |
| 5,603,417 A * | 2/1997 | Blair | ............... | A47F 5/0846 |
| | | | | 211/85.15 |
| 7,887,146 B1 * | 2/2011 | Louie | ............... | A61J 1/16 |
| | | | | 312/209 |
| 9,441,875 B1 * | 9/2016 | Froehlich | ............... | F25D 23/00 |
| 9,922,384 B2 * | 3/2018 | Cobb | ............... | G16H 70/40 |
| 2003/0189141 A1 * | 10/2003 | Turvey | ............... | B65D 33/14 |
| | | | | 248/95 |

\* cited by examiner

ACCOMMODATION DEVICE FOR ACCOMMODATING STORAGE CONTAINERS

CROSS-REFERENCE TO RELATED APPLICATIONS

The present patent application claims benefit and priority to German Application No. 20 2019 105 308.9 filed on Sep. 25, 2019 which is hereby incorporated by reference into the present disclosure.

FIELD

The present invention relates to an accommodation device for accommodating storage containers.

BACKGROUND

For example, storage containers are known in which pre-assorted bulk goods are stored. The bulk goods are accommodated in portions in the storage containers. The accommodation device serves for storing the filled storage containers, for example.

For example, such an accommodation device can be used for assorting the bulk goods in that a storage container can be temporarily stored in the accommodation device after having been filled, which filling process is often carried out manually.

For arranging the storage containers in a place-saving manner, they can be arranged in a suspended state and close to each other, for example. The place-saving arrangement can cause the storage containers to contact each other in the stored state. When one of the storage containers is removed, neighboring storage containers can therefore detach themselves from the accommodation device and fall down due to the contact with the storage container to be removed or by being unintentionally touched by the hand of a user.

When the accommodation device is manually operated, therefore a second hand is needed in most cases for steadying the neighboring storage containers.

SUMMARY

It is therefore an object of the present invention to provide an accommodation device for accommodating storage containers, which allows for a simplified operation during removal of a storage container such that storage containers are prevented from being unintentionally removed.

The accommodation device according to the invention for accommodating storage containers for pre-assorted good, for example bulk goods, comprises at least one holding frame and a plurality of storage containers for accommodating pre-assorted goods. The holding frame comprises a plurality of spaced-apart holding means, and each storage container comprises a suspension device made to fit the holding means. Each suspension device is adapted to be attached to one of the holding means for arranging the respective storage device in a manner suspending from the holding frame. According to the invention, at least some of, preferably all of the holding means respectively comprise a safety device which, in the condition of the suspension device as attached to the holding means, cooperates with the suspension device, and, in a locking position, prevents the suspension device from detaching itself from the respective holding means, wherein the safety device is adapted to be moved, via an operating means, into a release position in which the suspension device is released for removal from the holding means.

Thus, according to the invention, the storage containers are secured by a safety device in their condition as attached to the holding frame such that said safety device is to be operated only for removal of a storage container. The suspension devices of the storage containers are adapted to be introduced, inserted or suspended into the holding means, for example. The holding frame can comprise at least one holding bar at which the holding means are arranged, for example.

The accommodation device according to the invention offers the advantage that a storage container can only be removed from the accommodation device when the safety device has been operated and the other storage devices are secured by the respective safety device and thus cannot be unintentionally removed from the holding means. The accommodation device according to the invention can thus advantageously be manually operated with one hand since no additional steps for holding the neighboring storage containers in place are necessary. Thus the storage containers can be conveniently removed from the accommodation device.

The accommodation device according to the invention can be part of a cupboard or a cart, for example, and comprise one or a plurality of holding frames. Preferably, it is provided that the holding means each comprise at least one accommodation recess into which the suspension device is adapted to be suspended.

Alternatively, it is provided that the suspension device comprises a suspension protrusion made to fit the accommodation recess and adapted to be inserted into the accommodation recess. For instance, the suspension protrusion can be held in the suspension device in a form-fit manner. For example, the suspension protrusion can be inserted into the suspension device through the accommodation recess.

Preferably, it is provided that the storage containers each comprise a flexible filling opening, wherein the filling opening of a storage container is adapted to be closed by the respective suspension device. The flexible filling opening is thus deformable and can hence be opened for goods to be filled in and subsequently be deformed such that edges of the filling opening rest against each other so that they are adapted to be closed by the suspension device. The suspension device thus has the additional function of a closing device.

It can be provided that the suspension device comprises a first suspension device portion and a second suspension device portion, wherein the first and the second suspension device portion are each fastened to an edge of the filling opening of a storage container, wherein the first and the second suspension device portion are adapted to be fixed to each other for closing the filling opening of the storage container. In this manner, it is particularly easy to close the filling opening of a storage container.

It can be provided that the first and the second suspension device portion are adapted to be fixed to each other via a magnetic connection, a plug connection or a snap-on connection. Generally, other connection types are also conceivable as long as they are releasable.

The suspension protrusion can be of a split configuration such that a section each is arranged at the first and the second suspension device portion or the suspension protrusion is arranged at one of the two suspension device portions.

The storage containers can be configured as bags, for example. For instance, the storage containers can be made from a transparent plastic material such that the goods accommodated in the storage container are visible from the outside.

Preferably, it is provided that the safety device, in its locking position, cooperates with a retaining protrusion of the suspension device. Thus, locking of the suspension device in the holding device can be realized in a simple manner.

It can in particular be provided that the retaining protrusion is arranged at the suspension protrusion. Thereby, the former is accessible for the safety device in an advantageous manner such that a simple configuration can be realized.

According to a preferred embodiment of the invention, it is provided that the safety device comprises a locking lever, wherein the locking lever, in its locking position, is engaged by the suspension device or interlocks with the suspension device, wherein the locking lever is moved into the locking position by a self-acting restoring force. For example, the locking lever can be engaged by a deepened portion forming the retaining recess in the suspension device, said deepened portion being preferably formed in the suspension protrusion, or interlock with the retaining protrusion formed by the suspension protrusion. The self-acting restoring force ensures that the locking lever is always forced into the locking position such that a malfunction, where the locking lever is not moved into the locking position, is generally precluded.

The self-acting restoring force can be provided by the spring force of a spring or by gravity.

Preferably, it is provided that the locking lever comprises an inclined insertion portion, wherein the suspension protrusion, when being inserted into the accommodation recess, abuts on the inclined insertion portion and presses the locking lever towards the release position. In other words, upon insertion, the locking lever is automatically pressed towards the release position by the suspension protrusion, wherein the locking lever is allowed to snap into the locking position when the locking lever has overcome the retaining protrusion. This allows for a particularly advantageous operation.

For releasing, the operating means must move the locking lever into the release position against the self-acting restoring force.

The holding bar of the holding frame can be configured as a hollow profile, for example. The locking lever can be arranged in the interior of the hollow profile. This offers the advantage that the lever is better protected against environmental influences, such as contamination, and thus malfunctions can be avoided. When the holding bar is configured as a hollow profile, the accommodation recess is arranged in one of the side walls of the hollow profile. For guiding the holding protrusion in the accommodation recess and the interior of the hollow profile, the holding protrusion can comprise guide ribs on its lower side which slide in the accommodation recess and in the interior of the hollow profile and thus effect guiding of the holding protrusion.

Preferably, it is provided that the safety device is a two-sided lever which is articulated to the accommodation recess. One lever is constituted by the locking lever and the opposite lever serves as an operating means. It can be provided that the locking lever is longer than the lever constituting the operating means such that the locking lever is pressed into the locking position by gravity.

BRIEF DESCRIPTION OF THE FIGURES

Hereunder the invention will be explained in detail with reference to the accompanying drawings in which.

DETAILED DESCRIPTION

Figure 1:
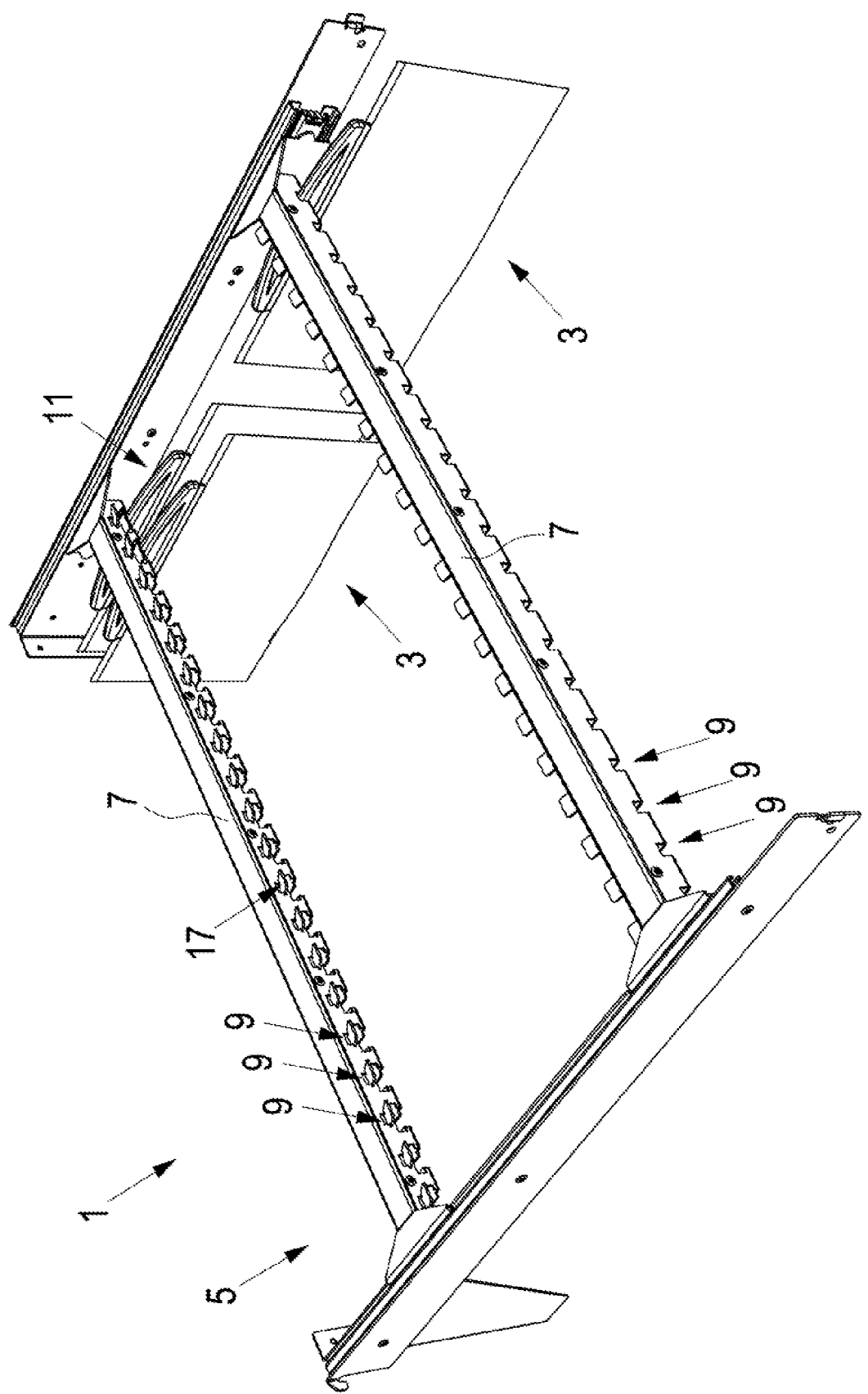
FIG. 1 shows a schematic perspective view of the holding frame of the accommodations device with storage containers arranged therein.

In FIG. 1, an accommodation device 1 according to the invention for accommodating storage containers 3 is schematically shown in a perspective diagram.

The accommodation device 1 can be part of a cupboard or a cart, for example.

The storage devices 3 serve for accommodating pre-assorted goods, such a bulk goods, for example. The bulk goods can be tablets, for example, or the goods can be packaged medicaments, and the accommodation device according to the invention can be used in hospitals or pharmacies, for example, for storing pre-assorted tablet portions or medicaments of patients in storage containers.

The accommodation device 1 according to the invention comprises at least one holding frame 5 on which a plurality of storage containers 3 (three storage containers 3 in FIG. 1) can be held.

The holding frame 5 comprises two holding bars 7 where a plurality of spaced-apart holding devices are arranged. Each storage container 3 is adapted to be suspendingly attached via a suspension device 11 made to fit the holding means 9.

Figure 2A:
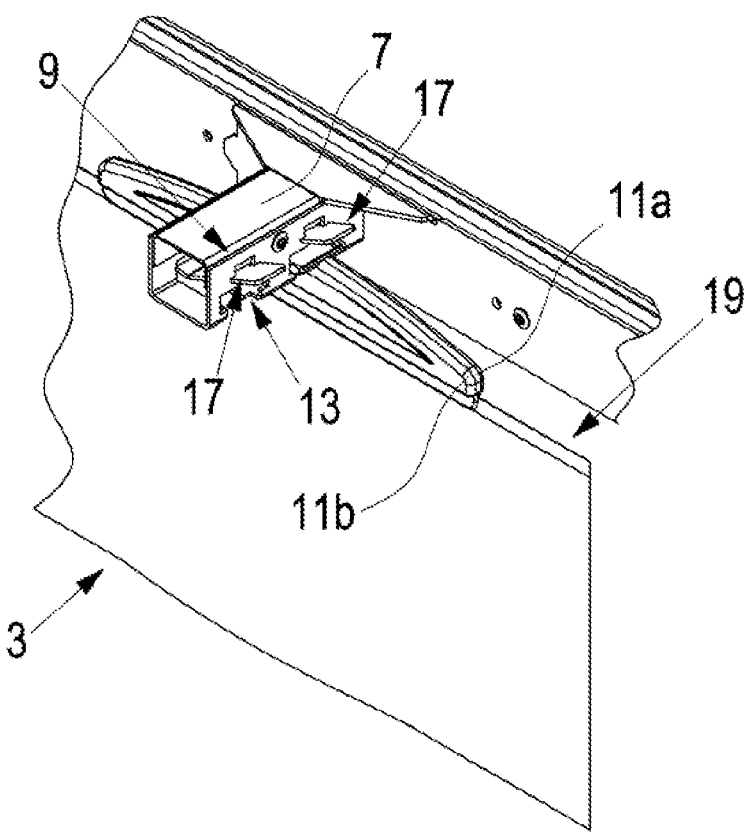
FIG. 2A shows a detailed view of the suspension device and the holding means of the accommodation device according to the invention.
Figure 2B:
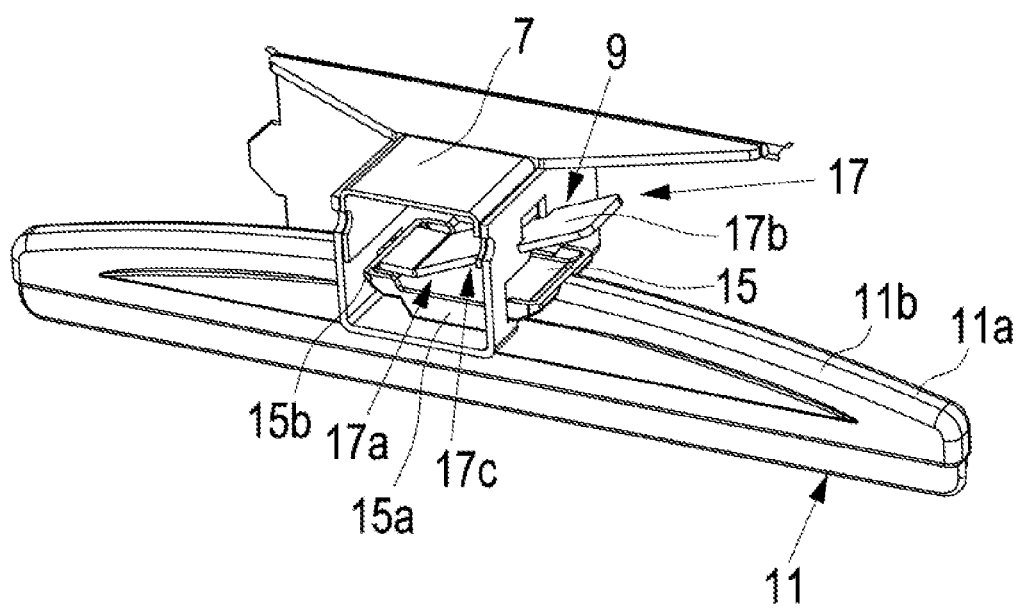
FIG. 2B shows another detailed view of the suspension device and the holding means of the accommodation device according to the invention.

In FIGS. 2A and 2B detailed diagrams of the holding means 9 and the suspension device 11 are schematically illustrated in detail. The holding bar 7 is illustrated in a sectional view.

As can be seen from FIGS. 2A and 2B, the holding bar 7 is configured as a hollow profile. The holding means 9 comprises an accommodation recess 13 into which the suspension device 11 can be inserted via a suspension protrusion 15 for suspendingly fastening the suspension device 11 to the holding means 9 and thus to the holding bar 7.

The shape of the suspension protrusion 15 is made to fit the shape of the accommodation recess 13. Further, the suspension protrusion 15 comprises lateral ribs 15a located on the lower side of the suspension protrusion 15 and guiding and supporting the suspension protrusion 15 in the holding means 9 and in the interior of the holding bar 7. Further, a safety device 17 is arranged at an accommodation recess 13, which safety device prevents the suspension device 11 from being removed from the holding means 9 in the illustrated locking position. For this purpose, the safety device 17 is engaged by the suspension protrusion 15 and cooperates with a retaining protrusion 15b.

The safety device 17 is configured as a two-sided lever, wherein a first lever is constituted by a locking lever 17a and a second lever is constituted by an operating means 17b. The safety device is pivotably supported in the accommodation recess 13. The locking lever 17a is longer than the operating lever 17b such that, due to the lever action, gravity causes the locking lever 17a to be moved into the illustrated locking position.

The locking lever 17a comprises an inclined insertion portion 17c on it lower side, the suspension protrusion 15 pressing against said inclined insertion portion when the suspension protrusion 15 is inserted into the accommodation recess thus pressing the locking lever 17a towards the release position. When the locking lever 17a has overcome the retaining protrusion 15b, the former can snap into the locking position. Thus the suspension device 11 can be removed from the holding means 9 only by operating the safety device 17 with the aid of the operating means 17b.

The storage containers 3 can be configured as bags and comprise a flexible filling opening 19. The suspension device 11 is of a two-part configuration, wherein a first suspension device portion 11a is arranged at a first edge of the filling opening 19 and a second suspension device portion 11b is arranged at a second edge of the filling opening 19. The filling opening 19 can thus be closed by the suspension device 11 since the first and the second suspension device portion 11a, 11b are adapted to be fixed to each other via a snap-on, plug or magnetic connection, for example.

In the exemplary embodiment illustrated in the Figures, the suspension protrusion 15 is arranged at the second suspension device portion 11b.

The accommodation device 1 according to the invention advantageously allows the storage containers 3 to be removed in a simple manner since upon removal of a storage container 3 it is ensured that unintentional touching of the neighboring storage containers 3 does not cause them to slip out of the holding means 9 and fall down. Thus, single-hand operation, for example, is possible in a simple manner.

LIST OF REFERENCE NUMERALS

1 Accommodation device
3 Storage container
5 Holding frame
7 Holding bar
9 Holding means
11 Suspension device
11a First suspension device portion
11b Second suspension device portion
13 Accommodation recess
15 Suspension protrusion
15a Lateral ribs
15b Retaining protrusion
17 Safety device
17a Locking lever
17b Operating device
17c Inclined insertion portion
19 Flexible filling opening

The invention claimed is:

1. An accommodation device for accommodating storage containers of pre-assorted goods, comprising:
 at least one holding frame and a plurality of storage containers for accommodating pre-assorted goods,
 wherein the holding frame comprises a plurality of spaced-apart holding means, and each of the plurality of storage containers comprise a suspension device made to fit one of the holding means,
 wherein each suspension device is adapted to be attached to one of the holding means for suspendingly arranging the respective storage container at the holding frame,
 wherein at least some of the holding means respectively comprise a safety device which cooperates with the suspension device when the suspension device is attached to a holding means and, in a locking position, prevents the suspension device from detaching itself from the respective holding means,
 wherein the safety device is adapted to be moved into a release position via an operating means, in which release position the suspension device is released for removal from the holding means,
 wherein the suspension device comprises a suspension protrusion made to fit an accommodation recess of the holding means in a form-fitting manner, and the suspension protrusion is adapted to be inserted into the accommodation recess, and
 wherein the suspension protrusion comprises a retaining protrusion having a deepened portion into which a locking lever of the safety device engages when the safety device is in the locking position, thereby preventing the suspension device from detaching from the holding means.

2. The accommodation device according to claim 1, wherein the storage containers each comprise a flexible filling opening, wherein the filling opening of a storage container is adapted to be closed by the respective suspension device.

3. The accommodation device according to claim 2, wherein the suspension device comprises a first suspension device portion and a second suspension device portion, wherein the first and the second suspension device portion are respectively fastened to an edge of the filling opening of a storage container, wherein the first and the second suspension device portion are adapted to be fixed to each other for closing the filling opening of the storage container.

4. The accommodation device according to claim 3, wherein the first and the second suspension device portion are adapted to be fixed to each other via a magnetic connection, a plug connection or a snap-on connection.

5. The accommodation device according to claim 1, wherein the locking lever is pressed into the locking position by a self-acting restoring force.

6. The accommodation device according to claim 5, wherein the self-acting restoring force is provided by a spring force or by gravity.

7. The accommodation device according to claim 5, wherein the locking lever comprises an inclined insertion portion, wherein the suspension protrusion, when being inserted into the accommodation recess, abuts on the inclined insertion portion and presses the locking lever towards the release position.

\* \* \* \* \*